US008226870B2

(12) United States Patent
Garcia Laja et al.

(10) Patent No.: US 8,226,870 B2
(45) Date of Patent: Jul. 24, 2012

(54) PRESSURE BULKHEAD MADE OF COMPOSITE MATERIAL FOR AN AIRCRAFT

(75) Inventors: Agustin Garcia Laja, Madrid (ES); Francisco Jose Cruz Dominguez, Madrid (ES)

(73) Assignee: Aiirbus Espana S. L., Madrid (ES)

( * ) Notice: Subject to any disclaimer, the term of this patent is extended or adjusted under 35 U.S.C. 154(b) by 299 days.

(21) Appl. No.: 12/760,678

(22) Filed: Apr. 15, 2010

(65) Prior Publication Data

US 2010/0258673 A1     Oct. 14, 2010

Related U.S. Application Data

(62) Division of application No. 11/699,743, filed on Jan. 30, 2007, now abandoned.

(30) Foreign Application Priority Data

Nov. 29, 2006   (WO) ................ PCT/ES2006/070186

(51) Int. Cl.
*B28B 7/00*     (2006.01)
(52) U.S. Cl. ....................... 264/241; 264/238
(58) Field of Classification Search ............. 244/117 R, 244/118.2, 119, 120; 264/238, 241
See application file for complete search history.

(56) References Cited

U.S. PATENT DOCUMENTS

| | | | | |
|---|---|---|---|---|
| 5,062,589 A | * | 11/1991 | Roth et al. | 244/117 R |
| 5,934,616 A | * | 8/1999 | Reimers et al. | 244/119 |
| 6,213,426 B1 | * | 4/2001 | Weber et al. | 244/117 R |
| 6,443,392 B2 | * | 9/2002 | Weber et al. | 244/117 R |
| 6,478,254 B2 | * | 11/2002 | Matsui et al. | 244/119 |
| 6,729,792 B2 | * | 5/2004 | Pritzer | 403/286 |
| 2002/0178583 A1 | * | 12/2002 | Holman et al. | 29/897 |
| 2006/0016930 A1 | * | 1/2006 | Pak | 244/12.4 |

* cited by examiner

*Primary Examiner* — Tien Dinh
*Assistant Examiner* — Justin Benedik
(74) *Attorney, Agent, or Firm* — Ladas & Parry LLP

(57) ABSTRACT

The present invention relates to a curved rear pressure bulkhead (1) made of a composite material, comprising three layers: an outer layer (2) and an inner layer (3) symmetrical with one another, which are made of a fiber laminate, and the intermediate layer or core (4) made of a lightweight material. With such a sandwich-type shape, the resulting bulkhead (1) is able to withstand the bending loads coming from the strain and pressurization of the fuselage without having to increase its stiffness by means of using some type of stiffener. The bulkhead (1) comprises a ring (6) that is attached to the ends of the sandwich shape. This ring (6) is split into several parts (8) to facilitate the assembly of the bulkhead (1) made of composite material to the fuselage skin (5).

8 Claims, 3 Drawing Sheets

PRESSURE BULKHEAD MADE OF COMPOSITE MATERIAL FOR AN AIRCRAFT

This is a divisional of copending application Ser. No. 11/699,743 filed on Jan. 30, 2007 and claims the benefit thereof and incorporates the same by reference.

OBJECT OF THE INVENTION

The present invention relates to a rear pressure bulkhead for aircraft made of a composite material as well as to the manufacturing process thereof.

BACKGROUND OF THE INVENTION

The pressure bulkhead for an aircraft is the structural component which supports the pressure of the fuselage of the aircraft at its ends. The strain that the fuselage of the aircraft is subjected to particularly when said fuselage is depressurized, in this case adding the negative pressure of the fuselage with the strain due, for example, to the loads from the vertical stabilizer, are transmitted to the rear pressure bulkhead, making it bend and buck and even collapse if it is not stiff enough. In addition, it is even more necessary with modern aircraft designs to manufacture pressure bulkheads minimizing their weight while at the same time maintaining their stiffness.

Pressure bulkheads made of metal, particularly aluminum, are known in the art, although these designs require metal stiffeners providing these bulkheads with sufficient stiffness to support fuselage strain.

In addition, pressure bulkheads made of a composite material, mainly CFRP (Carbon Fiber Reinforced with Plastic) are known which also require stiffeners made of CFRP to support strain coming from the fuselage.

Document U.S. Pat. No. 5,062,589 describes a pressure bulkhead for an aircraft made of a composite material and locally stiffened in its areas with the highest demand by means of introducing foam, thus increasing the thickness of the bulkhead in these areas. However, it is necessary to manufacture this bulkhead in sections so that it can be correctly assembled on the skin of the aircraft fuselage.

The object of the present invention is a pressure bulkhead for aircraft made of a composite material which solves the drawbacks of the prior art.

SUMMARY OF THE INVENTION

The present invention proposes a curved rear pressure bulkhead comprising three layers: the outer and inner layers, symmetrical in relation to one another, are formed by a fiber laminate, the intermediate layer or core being formed by a lightweight material. With such a sandwich-type shape, the resulting bulkhead is able to withstand the bending loads coming from the strain and pressurization of the fuselage without having to increase its stiffness by means of the use of some type of stiffener.

The bulkhead made of the composite material according to the present invention is furthermore made in a single piece without needing to be divided into sections facilitating its assembly on the aircraft fuselage skin, therefore its weight reduction, by eliminating any type of joint, is high while at the same time its assembly process is clearly simplified by reducing the assembly time due to greater integration of the assembly. The bulkhead of the invention comprises a ring that is attached to the ends of the sandwich shape, this ring being divided into several pieces to thus facilitate the assembly of the bulkhead made of composite material on the fuselage skin.

The invention also relates to the manufacturing process for manufacturing a pressure bulkhead made of a composite material, comprising the steps of:

a) forming and curing the layer of the core of the bulkhead;
b) laminating on a male jig the preimpregnated lamina of the outer and inner faces of the bulkhead on both sides of the layer of the already hard machined core;
c) curing the assembly of the outer and inner faces and the core.

Other features and advantages of the present invention will be understood from the following detailed description of the illustrative embodiments of its object in relation to the attached figures.

DETAILED DESCRIPTION OF THE INVENTION

The present invention proposes a curved rear pressure bulkhead 1 made of composite material, preferably in CFRP, made from carbon fibers and epoxy resin. The main advantage of CFRP is its strength/weight ratio given that it is a material which forms very lightweight but at the same time strong structures and which is easy to optimize in relation to those formed by isotropic materials. These advantages are essential for the design of pressure bulkheads for aircraft.

Figure 3:
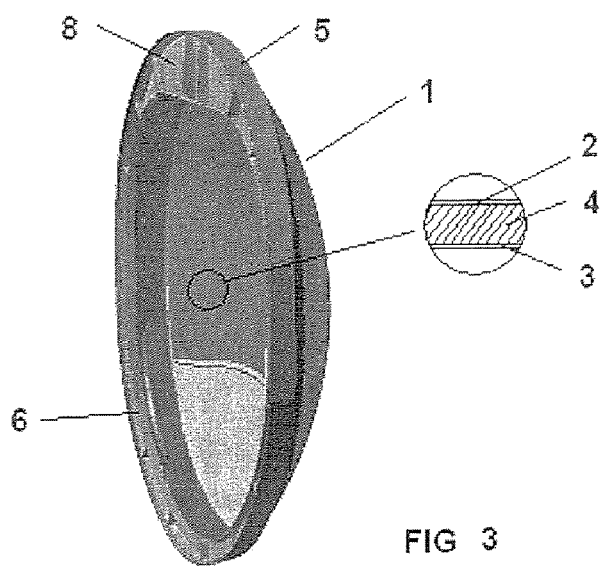
FIG. 3 shows a schematic sectional view of the pressure bulkhead made of a composite material according to the present invention.

The pressure bulkhead according to the invention is made in a single piece in a 360° spherical cap shape as can be seen in FIG. 3 and is formed by two fiber laminates, an outer laminate 2 and an inner laminate 3, between which a core 4 is introduced. The laminates 2, 3 are made of pre-impregnated fiber lamina which are positioned manually or by means of a fiber placement machine. The laminates 2 and 3 arranged on both sides of the core 4 are symmetrical in relation to one another, and it is not necessary for each laminate 2, 3 to be individually symmetrical. There can also be an adhesive layer between the laminates 2 and 3 and the core 4 which is necessary for preventing the laminates 2, 3 from coming off the core 4 due to a crease that may appear in the laminates 2, 3 as an effect of compression loads on the mentioned laminates 2, 3.

Figure 1:
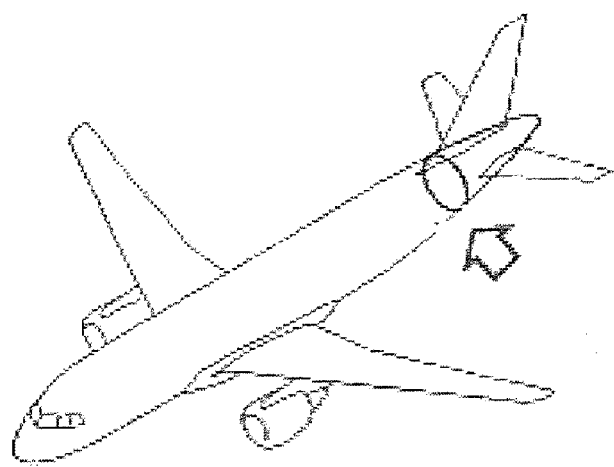
FIG. 1 shows a schematic view of the position of the rear pressure bulkhead in a typical pressurized aircraft.
Figure 2:
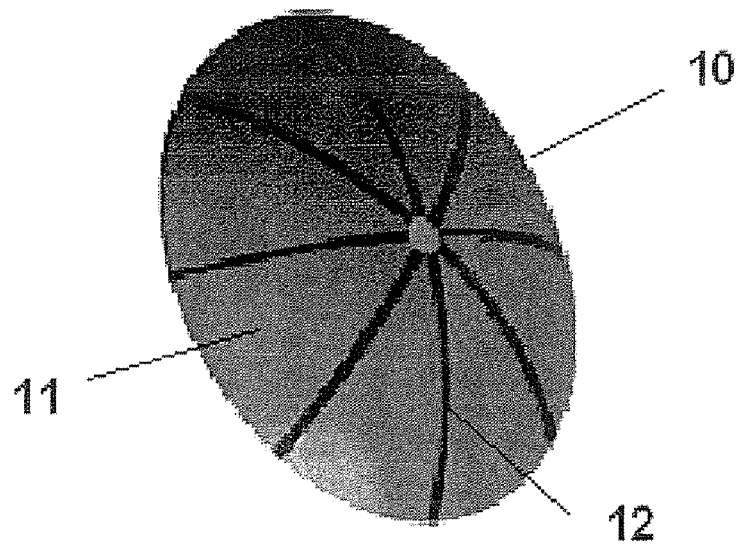
FIG. 2 shows a schematic view of the conventional stiffened rear pressure bulkhead of a pressurized aircraft.

The main advantage of a bulkhead 1 made of composite material according to the invention with a sandwich-type shape compared to any conventional monolithic bulkhead 10, as shown in FIG. 2, is that the bulkhead 1 of the invention withstands the bending load alone without needing to be stiffened with any type of stiffener 12, as in the case of the conventional bulkhead 10. This makes the pressure bulkhead 1 work more efficiently against loads coming from the strain of the fuselage while at the same time entailing a weight reduction in comparison with the designs of current stiffened bulkheads 10. In addition, a pressure bulkhead 1 according to the invention absorbs the membrane loads coming from the pressurization of the fuselage in the same way as any conventional monolithic bulkhead 10.

The core 4 comprised between the two laminates 2, 3 is formed by a lightweight material which can be formed or machined and which, according to a first preferred embodiment of the invention, is a foam. This foam minimizes typical water intake problems in sandwich-type composite structures while at the same time it is an optimal solution in terms of weight and easy machining.

According to another preferred embodiment of the invention, the core 4 comprised between the laminates 2 and 3 is formed by a honeycomb-type structure which can be made of paper, metal or another material, which structure allows exponentially increasing the stiffness of the pressure bulkhead 1 without affecting the weight of said bulkhead 1, which is more lightweight than the foam core 4.

The radius of the pressure bulkhead 1 will be a solution compromising between the minimum weight of said bulkhead 1 and the maximum space for systems and accessibility inside the aircraft.

Figure 4:
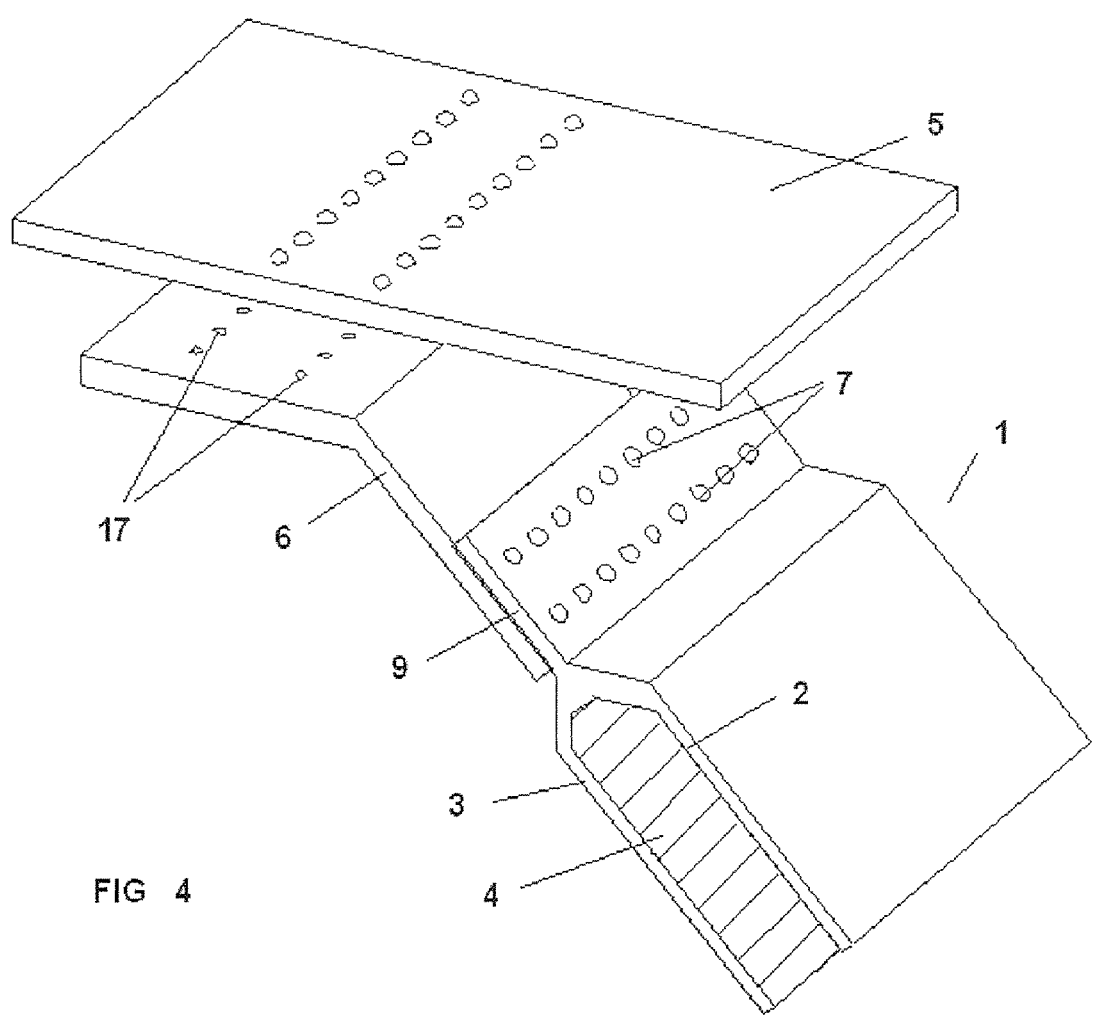
FIG. 4 shows a detail of the ring for attaching the bulkhead made of composite material according to the invention to the aircraft fuselage skin.
Figure 5:
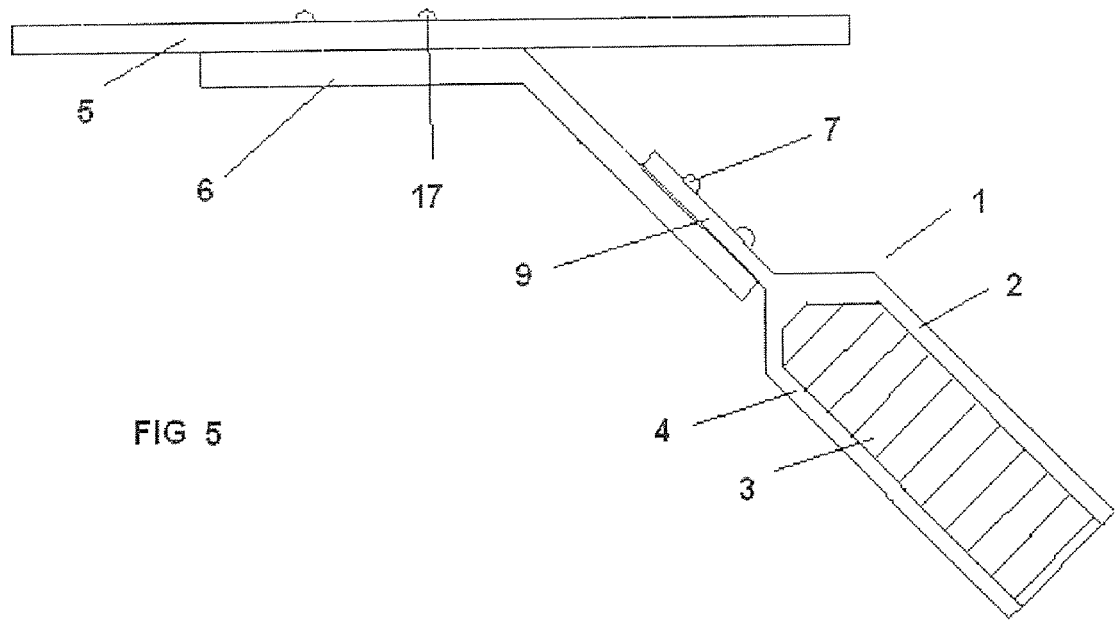
FIG. 5 shows a sectional view of the detail of the ring for attaching the bulkhead made of composite material according to the invention to the aircraft fuselage skin.
Figure 6:
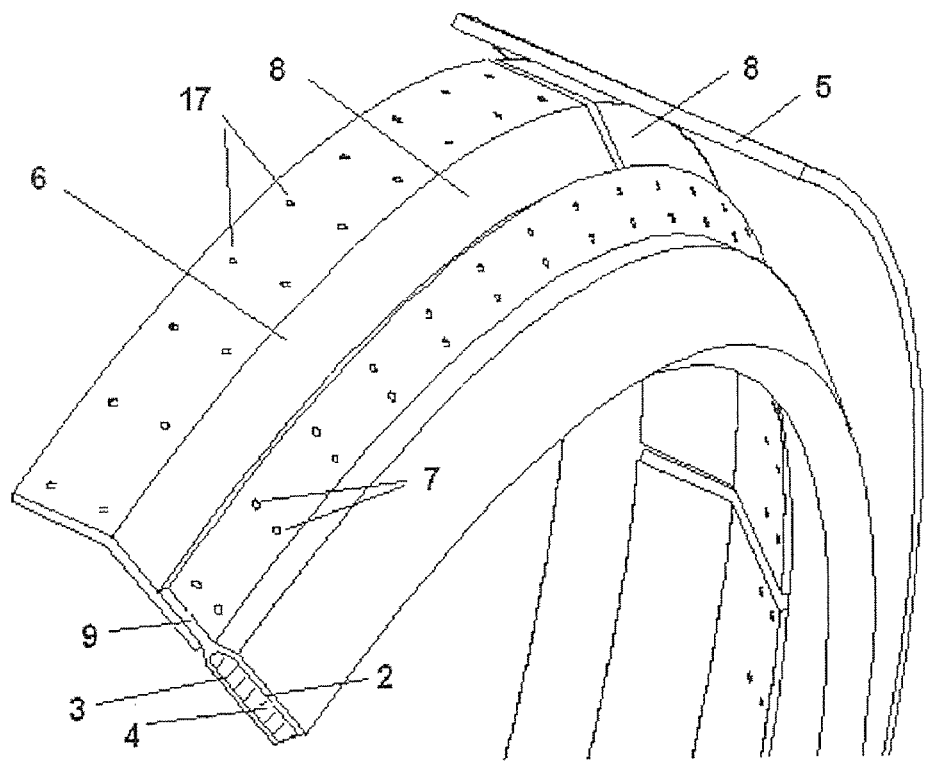
FIG. 6 shows a detail of the ring for attaching the bulkhead made of composite material according to the invention.

The pressure bulkhead 1 made of composite material is made of a single piece, without needing to be divided into sections 11 like a conventional bulkhead 10. To allow the assembly of said bulkhead 1 to the aircraft fuselage skin 5, the bulkhead 1 further comprises a ring 6 made by means of resin transfer molding, or RTM, or it is made of titanium, divided into several pieces 8 to facilitate attaching the bulkhead 1 to the fuselage skin 5. As can be seen in FIGS. 4 and 5, the ends of the pressure bulkhead 1 are formed only by one fiber laminate 9, such that these ends 9 are attached to the ring 6 by means of rivets 7, in turn attaching sections 8 of the ring 6 to the aircraft fuselage skin 5 by means of the corresponding rivets 17.

The present invention further proposes in a second aspect a manufacturing process for manufacturing a pressure bulkhead 1 made of composite material comprising two inner and outer laminates 2 and 3, respectively, and a core 4 made of a lightweight material, comprising the following steps:

a) curing the layer of the core 4 with a planar plate shape
  b) heat machining and forming the layer of the core 4 so that it acquires its final shape;
  c) stabilizing the layer of the core 4 so that its shape is not modified during the final curing of the bulkhead 1;
  d) laminating the outer and inner laminates 2, 3 of the bulkhead 1 with a fiber placement machine or manually on a male jig on both sides of the layer of the core 4;
  e) curing the assembly of the laminates 2, 3 and the core 4 in an autoclave.

Any modifications comprised within the scope defined by the following claims can be introduced in the preferred embodiments just described.

The invention claimed is:

1. A manufacturing process for manufacturing a rear pressure bulkhead (1) made of composite material for aircraft fuselage made of a single piece of composite material having a unitary composition throughout said bulkhead, said bulkhead comprising three layers: an outer layer (2) made of a fiber laminate, an inner layer (3) made of a fiber laminate and an intermediate layer or core (4) made of a lightweight material, the laminate of the outer layer (2) an inner layer (3) being symmetrical one another, said method comprising the following steps:

a) curing the layer of the core (4) with a planar plate shape;
  b) heat machining and forming the layer of the core (4) so that it acquires its final shape;
  c) stabilizing the layer of the core (4) so that its shape is not modified during the final curing of the bulkhead (1);
  d) laminating the outer and inner laminates (2), (3) of the bulkhead (1) with a fiber placement machine or manually on a male jig on both sides of the layer of the core (4); and
  e) curing the assembly of the laminates (2), (3) and the core (4) in an autoclave wherein said bulkhead is able to sufficiently withstand strain and pressurization of the aircraft fuselage without any additional stiffening agents.

2. A method as claimed in claim 1, wherein said rear pressure bulkhead has an end (9) formed by a fiber laminate, said end (9) is affixed to a ring (6) that is attached to the aircraft fuselage.

3. A method as claimed in claim 2, wherein said ring (6) is divied into pieces (8).

4. The method of claim 1, wherein the core (4) is made of foam.

5. The method of claim 1, wherein the core (4) is honeycomb-like.

6. The method of claim 1, wherein the composite material is CFRP.

7. The method of claim 1, wherein an adhesive layer is applied between the outer layer (2) and the core (4) and between the inner layer (3) and the core (4).

8. A rear pressure bulkhead (1) for aircraft fuselage made of a composite material whenever obtained by the method of claim 1.

* * * * *

UNITED STATES PATENT AND TRADEMARK OFFICE
CERTIFICATE OF CORRECTION

PATENT NO. : 8,226,870 B2
APPLICATION NO. : 12/760678
DATED : July 24, 2012
INVENTOR(S) : Agustin Garcia Laja et al.

It is certified that error appears in the above-identified patent and that said Letters Patent is hereby corrected as shown below:

Title Page, item (73), Assignee: "Aiirbus Espana, S.L." should read
--Airbus Operations, S.L.--.

Signed and Sealed this
Twenty-ninth Day of January, 2013

David J. Kappos
*Director of the United States Patent and Trademark Office*